(12) United States Patent
Cereda et al.

(10) Patent No.: US 6,693,777 B1
(45) Date of Patent: Feb. 17, 2004

(54) METHOD FOR CONTROLLING THE OPERATION OF A SWITCHING DEVICE

(75) Inventors: Carlo Cereda, Caravaggio (IT); Carlo Gemme, Genova Quinto (IT); Andrea Moratto, Milan (IT); Gunter Lichtenberger, Kreimbach/Kaulbach (DE)

(73) Assignee: ABB T&D Technologies Ltd., Zurich (CH)

( * ) Notice: Subject to any disclaimer, the term of this patent is extended or adjusted under 35 U.S.C. 154(b) by 17 days.

(21) Appl. No.: 10/069,722

(22) PCT Filed: Jul. 25, 2000

(86) PCT No.: PCT/EP00/07172

§ 371 (c)(1), (2), (4) Date: May 21, 2002

(87) PCT Pub. No.: WO01/16975

PCT Pub. Date: Mar. 8, 2001

(51) Int. Cl.[7] .................................................. H02H 3/00
(52) U.S. Cl. ........................ 361/5; 361/6; 361/7; 361/3
(58) Field of Search ................................ 361/3, 268, 7, 361/5, 6

(56) References Cited

U.S. PATENT DOCUMENTS 5,734,207 A * 3/1998 LeCourt ...................... 307/127
6,295,188 B1 * 9/2001 Ebersohl ......................... 361/3

FOREIGN PATENT DOCUMENTS

| DE | 41 05 697 | 8/1992 |
| WO | 99 00811 | 1/1999 |

* cited by examiner

*Primary Examiner*—Hung V. Ngo
(74) *Attorney, Agent, or Firm*—Oblon, Spivak, McClelland, Maier & Neustadt, P.C.

(57) ABSTRACT

A method for controlling the closing operation of a switching device, which is disposed on an electrical network connected to an inductive component. The method requires first data related to the electrical characteristics of the inductive component and the electrical network. Based on the first data, on a predefined first storage device containing opening and closing operation sequences, a first predefined opening operation sequence is selected. Then, based on the first predefined opening operation sequence, on the first storage device, a first predefined closing operation sequence is selected.

12 Claims, 4 Drawing Sheets

METHOD FOR CONTROLLING THE OPERATION OF A SWITCHING DEVICE

The present invention relates to a method for controlling the operation of a switching device. More particularly the present invention relates to a method for controlling the opening/closing operation of a switching device disposed on an electrical network, which is connected to an inductive component, such as a transformer, a reactance and the like.

BACKGROUND OF THE INVENTION

Many examples of methods for controlling the operation of switching devices such as a circuit breakers, disconnectors and the like are reported in the state of the art. So, it is well known that switching devices generally operate in response to commands, either automatic or manual that are sent from a control and monitoring panel. This means that operation can take place in a "random" manner in relation to the parameters of the electrical network (either tri-phase or mono-phase) the switching devices are connected to. Performing closing/opening operation asynchronously in relation to the electrical network parameters, generates very often electrical transients and/or electrical arcing phenomena, such as the so called "pre-strikes" or "restrikes", that are generally extremely damaging.

These undesired effects are obviously present when a switching device is disposed on a electrical network connected to an inductive component. After an opening operation is performed, a residual flux is present in the magnetic core of the inductive component. The quantity of residual flux depends on the hysteresis cycle, which characterises the magnetic core of the inductive component. Unfortunately, said quantity is not constant but it varies due to various reasons such as, for example, the presence of stray capacitances. This fact implies that the quantity of residual flux still present in the magnetic core can be unknown. Therefore, the subsequent closing operation, with an "asynchronous" switching device, can be performed in relation to a magnetic state, which can be very different from the one actually present in the magnetic component. So, high current transients (called "in-rush currents"), which are characterised by very high magnetisation currents (ten-twenty times the rated current) with strong harmonic content, can arise. The presence of high current transients causes power peaks, the management of which is very difficult to perform. So, for example, in low power networks it is necessary to provide for many generators in parallel, in order to avoid network instability problems. Also in emergency network it is necessary to connect the present transformers once at time, waiting often for the lowering of the current transients. In secondary distribution networks many problems can arise due to the failure of protection fuses. Moreover the presence of a strong harmonic content, particularly of the $2^{nd}$ order, leads to a lower Power Quality (PQ) of the whole network. The presence of a strong harmonic content can also arise problems in the management of the network protection.

In order to minimise these damaging transient effects, many methods of the state of the art provide for performing the electrical operation in a "synchronous" manner. The operation is then performed in relation to the network parameters, which is to say to determine, for example in the case of a three-phase network, sequences of optima operating moments. Each of these sequences, hereinafter defined as an "operation sequence", is a sequence of moments in which voltage and/or current of each phase reaches desired values. Each operation sequence can be performed independently for each pole of the switching device.

In case of switching devices connected to inductive components, solutions are known in which the choice of an optimal operation sequence is actually pre-defined.

For example, U.S. Pat. No. 5,119,260 offers a choice of the optimal operation in relation to the opening operation only. The moments, which are out of phase by a fixed amount of time in relation to the passage through the current zero, are pre-set as optimal. This situation is entirely unsuitable for other types of operations, such as the closing operation.

Other solutions allow one to choose the optimal operation sequence in a relation to the type of operation only without taking the load into account. For example, U.S. Pat. No. 5,361,184 takes the current zeros as the optimal moments for opening operations and the voltage zeros as the optimal moments for closing operations, irrespective of the type of load.

Also this type of solutions is unsuitable because it does not take in account the specific problems arising when an inductive component is connected to the network.

Other methods propose as optima for a closing operation sequence, the moments in which the voltage reaches its maximum. Even if this solution represents a technical progress in relation to the previous solutions described, is unsuitable and unable to drastically reduce the current transients. In fact, the mentioned variations of the inductive flux are not taken into account.

In conclusion, one may assert that the known solutions of the state of the art, while achieving the task for which they were designed, do not guarantee the effective reduction of the current transients when switching device operations are performed in presence of inductive components.

SUMMARY OF THE INVENTION

The aim of the present invention is to provide a method for controlling the opening/closing operations of a switching device, disposed on a electrical network connected to an inductive component, which allows to reduce drastically the mentioned transient effects.

As part of this task, one object of the present invention is to provide a method, which allows reducing the so called "in-rush currents" to negligible values if compared with the rated current, so as to improve the power quality of the electrical network and to avoid other mentioned problems.

Another object of the present invention is to provide a method, which allows drastically reducing the low order current harmonics, so as to improve the functionality and management of the network protection devices.

A further object of the present invention is to provide a method, which can be easily realised using processing systems of common use.

Thus, the present invention provides a method for controlling the closing operation of a switching device, said switching device being disposed on a electrical network, said electrical network being connected to an inductive component, comprising the following steps:

a) acquiring first data related to the electrical characteristics of said inductive component and said electrical network;

b) based on said first data, selecting, on predefined first storage means containing predefined opening and closing operation sequences, a first predefined opening operation sequence;

c) based on said first predefined opening operation sequence, selecting, on said first storage means, a first predefined closing operation sequence.

Further characteristics and advantages of the invention shall emerge more clearly from the description of preferred but not exclusive embodiments of the method as in the invention, illustrated purely by way of example and without limitation in the attached drawings, in which:

DETAILED DESCRIPTION

Figure 1:
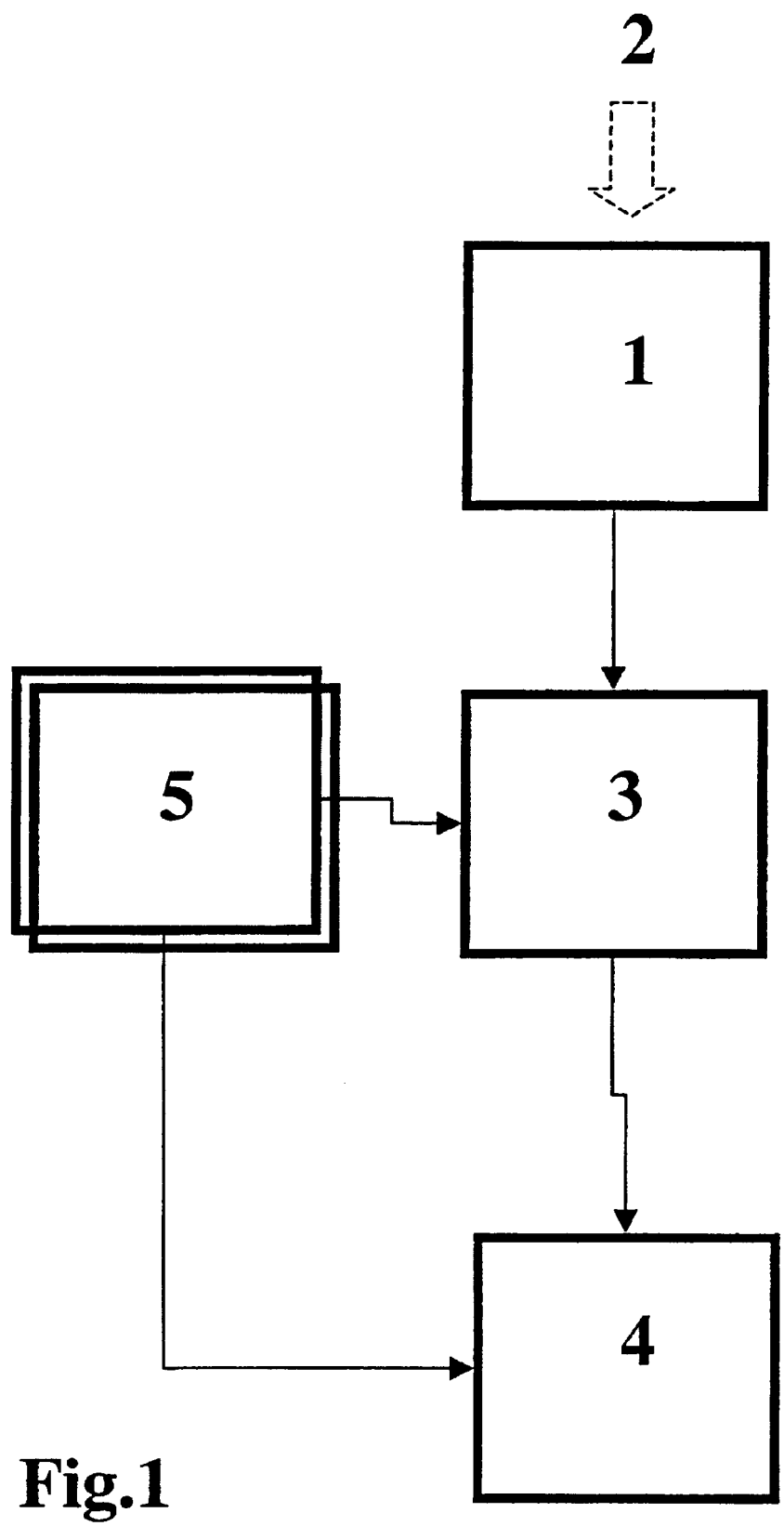
FIG. 1 is a diagram illustrated the sequence of steps executed bt the method as in the invention.

With reference to the mentioned figures, the method as in the present invention comprises the step a) (reference 1) of acquiring first data (dotted arrow 2) related to the electrical characteristics of the inductive component and of the electrical network. First data 2 comprise preferably data related to the type of connection of the inductive component to the electrical network and/or data related to the state of the neutral connection of the electrical network and/or data related to the network impedance voltage, rated voltage and rated power. At step b) (reference 3), a first predefined opening operation sequence (reference 4) is selected. The predefined opening operation sequence, which is a predefined sequence of moments in which voltage and/or currents reaches desired values (e.g. for performing the opening operation), is selected on predefined first storage means 5, containing predefined opening/closing operation sequences. First storage means 5 can be predefined tables or libraries or other means, electronic or not, for memorising information. First data 2, which can be memorised on predefined second storage means (not illustrated in FIG. 1), are in practice used to address the first storage means 5. Second storage means can be of the same type of the first storage means 5 previously described.

At step c) (reference 6 of FIG. 2) a first predefined closing operation sequence is selected on the first storage means 5. The selection of the predefined closing operation sequence, which is a predefined sequence of moments in which voltage reaches desired values (e.g. for performing the closing operation), is performed based on the predefined opening operation sequence selected at step b). Said predefined sequence is, in practice, used to address the first storage means 5 in order to select the most proper closing operation sequence.

This solution is particularly advantageous because, known the parameters of the inductive component connected to the network after the acquisition of the first data at step a), it is possible to select the opening sequence so as to reach, after its execution, a known magnetic state of the inductive component. Based on the knowledge of said magnetic state, one can select the most proper closing operating sequence in order to reduce the mentioned transient phenomena. In practice one or more closing operation sequences are predefined taking into account a possible magnetisation state of the inductive component. They are selected depending on the magnetisation state into which the previous opening operation sequence is foreseen to bring the inductive component.

The first storage means 5 contain, among said predefined closing operation sequences, at least a general purpose predefined closing operation sequence. Said general purpose predefined closing operation sequence is used when, for various reasons that will be described hereinafter, the magnetisation state of said inductive component is unknown in order to maintain, in any case, the transients, due to the closing operation, below a threshold level. An example of said general purpose predefined closing operation sequence is a sequence of moments in which the phase voltage reaches its maximum.

A first case, wherein said general purpose predefined closing operation sequence can be used, is for example when the inductive component is installed for the first time on the network. In this case, because the inductive component is not energised yet, the magnetisation state is actually unknown. So, the first closing operation, can be performed using said general purpose closing operation sequence. Current transients are then surely present but they will be maintained under a safe level (for example 2–3 times the rated current). The execution of the mentioned general purpose closing sequence 6 have also the aim of bringing the inductive component in a state from which the method, as in the present invention, can be applied more easily. In practice, in this case, its execution can be considered a step of the "start-up" procedure to be run, when an inductive component has been just installed.

Figure 2:
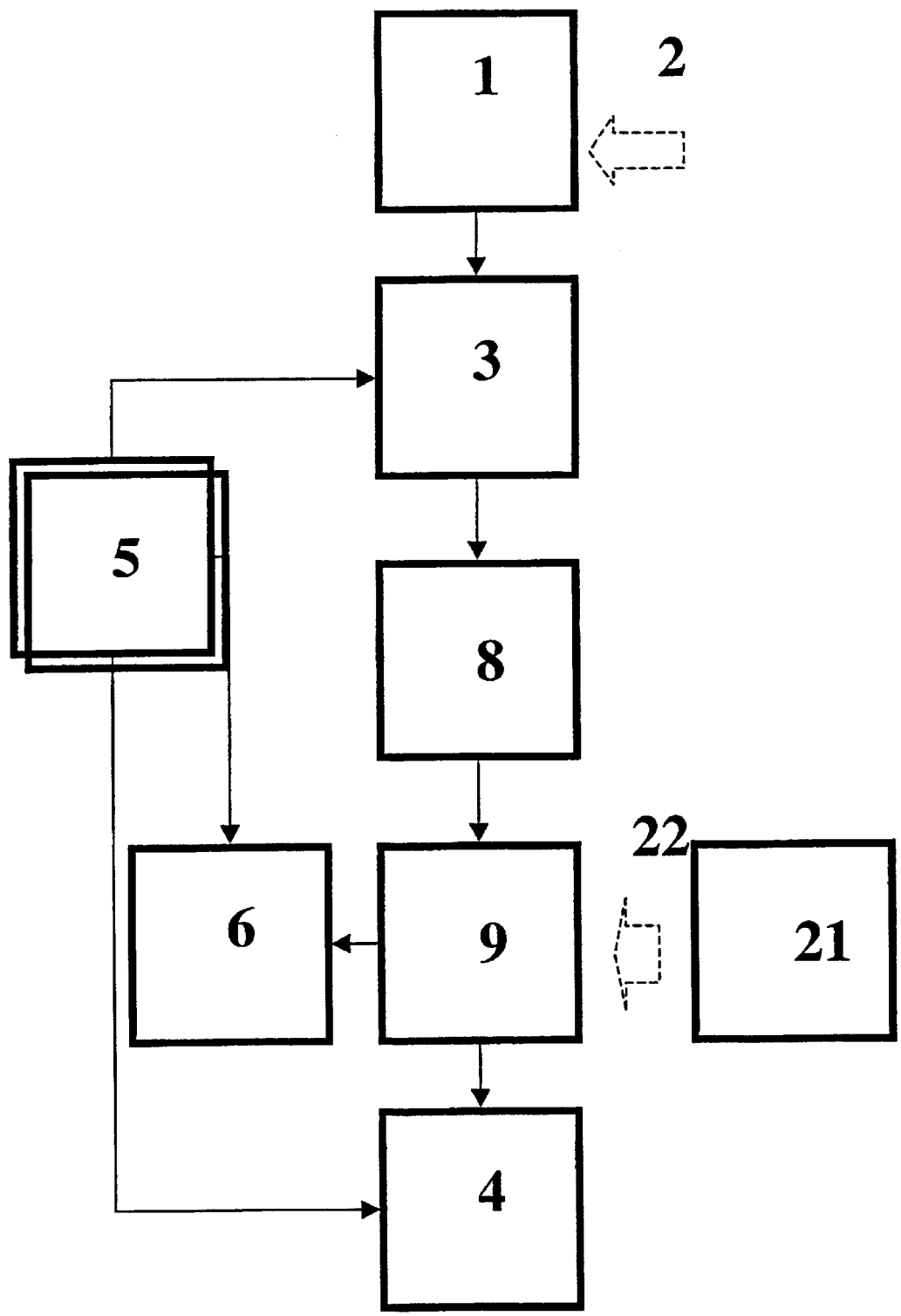
FIG. 2 is a diagram related to a preferred but not limiting embodiment of the method as in the invention.

Referring to FIG. 2, another advantageous embodiment of the method as in the present invention, in which said general purpose predefined closing operation sequence can be used, is disclosed. After step b) (reference 3), said embodiment comprises (reference 8) the step of executing said first predefined opening operation sequence 3. Then, (reference 9), the method provides for acquiring and checking second data (dotted arrow 22) related to the correct/incorrect execution of the first opening operation sequence 3 are acquired and checked. Second data 22 can be, for example, logic signals acquired from detecting and alarm means 21 that can be preferably represented by logic controls and/or sensors checking if the opening operation sequences has been actually performed on the foreseen moments. In case the first opening operation sequence 3 has been executed correctly then (reference 4) a predefined closing operation sequence is chosen from the first storage means 5, basing of said first opening operation sequence (reference 6). On the contrary, if the first opening operation sequence 3 has not been executed correctly, the general purpose predefined closing operation sequence is selected from the first storage means S (reference 6).

This embodiment of the method as in the present invention has the advantage of allowing checking if the opening operation of the switching device is determined by the selected sequence or by events not desired, such as, for example, a protection tripping event. In this case, the quantity of residual flux present in the core of the magnetic current would be unknown: closing with a sequence of moments selected basing on the previous opening sequence could not be a correct choice.

Figure 3:
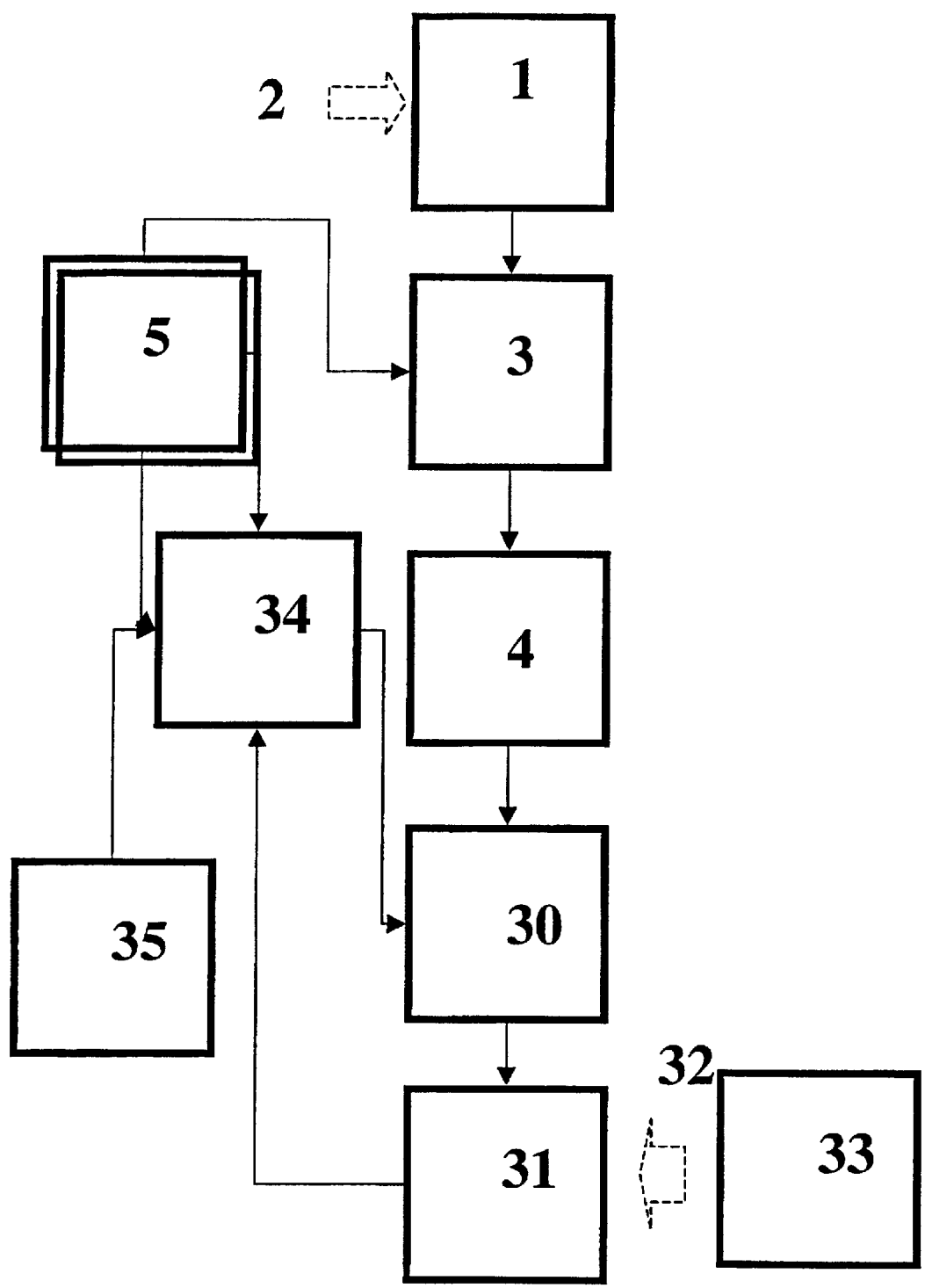
FIG. 3 is a diagram related to a further preferred but not limiting embodiment of the method as in the invention.

Referring to FIG. 3, a further embodiment of the method as in the present invention is presented. In this embodiment, after the selection of a predefined closing operation sequence, it is provided (reference 30), the execution of said first predefined selected closing operation sequence. Then (reference 31), third data (dotted arrow 32) are acquired from detecting means 33 that can be represented, for example, by current and/or voltage transducers. Third data 32 are related to the amplitude of the electrical transients due to the execution of the first predefined closing operation sequence at step 30. If the value of third data 32 exceed a predefined threshold then, at step 34, a further closing operation sequence is determined for possible use in the next closing operation. The closing operation sequence can be one or those already predefined on the first storage means 5 or, alternatively, calculated from the previous by incremental calculations 35, using for example iterative mathematical methods.

Steps 30–34 can be repeated, if data 32 exceed said threshold again, determining, at every loop, a new further closing operation sequence. This embodiment is particularly advantageous because it uses an adaptive approach for choosing the most appropriate closing operating sequence. In practice, it is chosen the closing operation sequence, which does not cause transients to overcome a predefined threshold.

The method as in the present invention has proven to be actually effective in reducing the current transients to negligible values, if compared to the inductive component rated current, particularly in three-phase applications such as power transformers disposed on medium voltage distribution networks. A reduction of the transient effects of more the 70% has been measured in this kind of applications. Moreover also the harmonic content has been measured at negligible values, so as allowing an easy and less expensive protection management.

Figure 4:
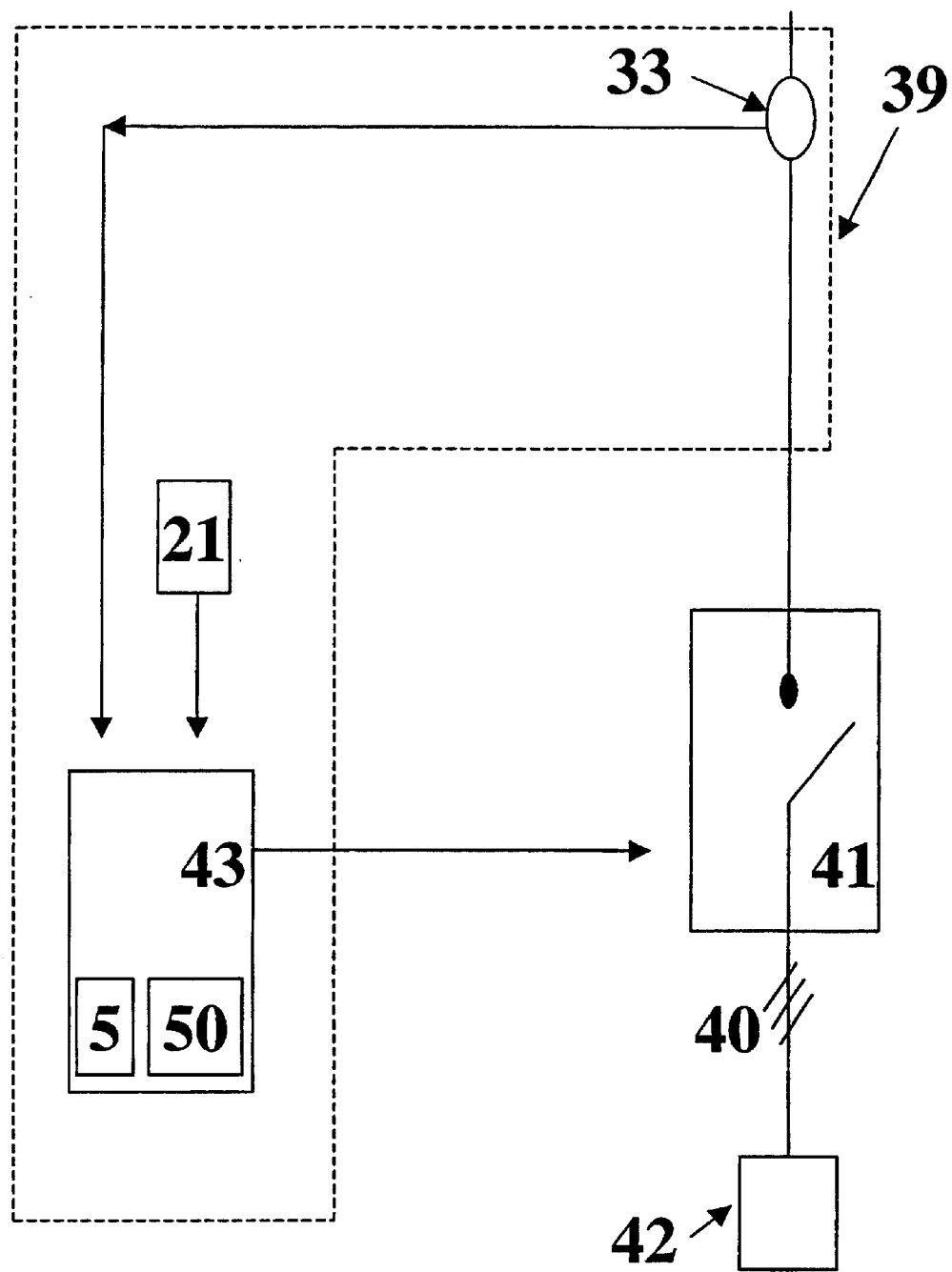
FIG. 4 is a diagram related to a further preferred but not limiting embodiment of a control device implementing the method as in the invention.

The method as in the present invention can also be implemented easily adopting processing systems of common use. With reference to FIG. 4, a diagram of a control device 39 implementing the method as in the present invention is presented. It can be noticed an electrical network 40 (either mono-phase or three-phase) on which a switching device 41 and an inductive component 42 are connected. Preferably the control device 39 (see the dotted line) comprises, connected to a processing unit 43, said detecting means 33 for acquiring said third data 32 and detecting and said alarm means 21 for acquiring said second data 22. The processing unit 43 can be represented by a microprocessor controller able, following a trip command, to select a opening and/or closing operation sequence. The control device comprises said first storage means 5 containing said opening/closing operation sequences and said second storage means (reference 50) for memorising said first data 2. First and second storage means can be comprise in the processing unit 43 (as describe in FIG. 4) or be connected separately.

The foregoing description of preferred embodiments of the present invention has been presented for purposes of illustration. It is not intended to be exhaustive or to limit the invention to the precise form disclosed and obviously many modifications and variations are possible in light of the above teaching. In practice many variations may suggest themselves to those skilled in the art within the scope of the invention disclosed herein.

What is claimed is:

1. A method for controlling the closing operation of a switching device, said switching device being disposed on a electrical network, said electrical network being connected to an inductive component, characterised in that it comprises the following steps:
   a) acquiring first data related to the electrical characteristics of said inductive component and said network;
   b) based on said first data, selecting, on predefined first storage means containing opening and closing operation sequences, a first predefined opening operation sequence;
   c) based on said first predefined opening operation sequence, selecting, on said first storage means, a first predefined closing operation sequence.

2. A method according to claim 1 characterised in that said first data related to the electrical characteristics comprises:
   data related to the type of connection of said inductive component to said electrical network; and/or
   data related to the state of the neutral connection of said electrical network; and/or
   data related to the network impedance voltage, rated voltage and rated power.

3. A method according to claim 1, characterised in that said predefined opening sequences are predefined sequences of moments in which voltage and/or current reaches desired values.

4. A method according to claim 1, characterised in that said predefined closing sequences are predefined sequences of moments in which voltage reaches desired values.

5. A method according to claim 4, characterised in that at least one or more of said predefined closing operation sequences is a general purpose predefined closing operation sequence, said general purpose predefined closing operation sequence being used when the magnetisation state of said inductive component is unknown and being predefined in order to maintain transients, due to a closing operation, below a threshold level.

6. A method according to claim 4, characterised in that at least one or more of said predefined closing sequences takes into account the magnetisation state of said inductive component.

7. A method according to claim 6, characterised in that said general purpose predefined closing operation sequence is used at the starting-up of said inductive component.

8. A method according to claim 1, characterised in that it comprises the following steps:
   executing said first predefined closing operation sequence; and
   acquiring and checking third data, related to the amplitude of the transients due to the execution of said first predefined closing operation sequence; and
   if said third data exceed a predefined threshold, determining a further closing operation sequence for possible use in the next closing operation.

9. A method according to claim 8, characterised in that said further closing operation is predefined and selected on said first storage means.

10. A method according to claim 8, wherein said further closing operation is determined by incremental calculations.

11. A method according to claim 1, characterised in that it comprises the following steps:
   executing said first predefined opening operation sequence; and
   acquiring and checking second data, related to said opening operation sequence; and alternatively
   if said first opening operation sequence has been correctly executed, selecting the corresponding first predefined closing operation sequence; or
   if said first opening operation sequence has not been correctly executed, selecting said general purpose predefined closing operation sequence.

12. A control device for executing a method according to claim 1, characterised in that it comprises:
   said predefined first storage means containing said opening/closing operation sequences; and
   second predefined storage means for memorising said first data related to electrical characteristics of said network and said inductive component; and
   a processing unit which, following a trip command, selects one of the predefined opening/closing operation sequences; and
   detecting and alarm means for acquiring and checking said second data related to the execution of an opening operation; and
   detecting means for acquiring said third data related to the electrical transients due to the execution of a closing operation.

* * * * *

UNITED STATES PATENT AND TRADEMARK OFFICE
CERTIFICATE OF CORRECTION

PATENT NO. : 6,693,777 B1
DATED : February 17, 2004
INVENTOR(S) : Cereda et al.

It is certified that error appears in the above-identified patent and that said Letters Patent is hereby corrected as shown below:

Title page,
Item [30], Foreign Application Priority Data, should read:
-- [30]      Foreign Application Priority Data
   Sep. 1, 1999    (EP) ......................... 99202828.2 --

Signed and Sealed this

Fourth Day of May, 2004

JON W. DUDAS
*Acting Director of the United States Patent and Trademark Office*